United States Patent
Strasser et al.

(10) Patent No.: US 9,097,379 B1
(45) Date of Patent: Aug. 4, 2015

(54) ARTICULATING SUPPORT FOR ELECTRONIC DEVICES

(75) Inventors: Michael J. Strasser, San Francisco, CA (US); Clinton Slone, San Francisco, CA (US)

(73) Assignee: Gomite, LLC, San Francisco, CA (US)

( * ) Notice: Subject to any disclaimer, the term of this patent is extended or adjusted under 35 U.S.C. 154(b) by 603 days.

(21) Appl. No.: 13/280,928

(22) Filed: Oct. 25, 2011

Related U.S. Application Data

(60) Provisional application No. 61/455,717, filed on Oct. 25, 2010.

(51) Int. Cl.
  *F16M 11/04* (2006.01)
  *F16M 13/00* (2006.01)
  *F16M 11/16* (2006.01)

(52) U.S. Cl.
  CPC .............. *F16M 13/00* (2013.01); *F16M 11/04* (2013.01); *F16M 11/16* (2013.01)

(58) Field of Classification Search
  CPC . F16M 13/00; F16M 220/0108; F16M 11/16; F16M 11/04; F16M 2200/08; G03B 17/56; G03B 17/561; G03B 17/566; G03B 17/568; F16B 2001/0035
  USPC ......... 248/346.06, 177.1, 187.1, 206.5, 181.1
  See application file for complete search history.

(56) References Cited

U.S. PATENT DOCUMENTS

| | | | |
|---|---|---|---|
| 4,719,549 A | 1/1988 | Apel | |
| 5,772,164 A * | 6/1998 | Shen | 248/170 |
| 5,790,910 A * | 8/1998 | Haskin | 396/427 |
| 6,209,830 B1 * | 4/2001 | Brotz | 248/187.1 |
| 6,350,076 B1 | 2/2002 | Wagner et al. | |
| 6,352,228 B1 | 3/2002 | Buerklin | |
| 6,439,518 B2 | 8/2002 | Brotz et al. | |
| 7,163,181 B2 | 1/2007 | Omps | |
| 7,621,492 B2 | 11/2009 | Omps | |
| 7,909,521 B2 | 3/2011 | Son | |
| 2007/0114346 A1 * | 5/2007 | Omps | 248/181.1 |
| 2008/0023607 A1 * | 1/2008 | Barker | 248/288.51 |
| 2009/0196597 A1 * | 8/2009 | Messinger et al. | 396/427 |
| 2010/0237206 A1 * | 9/2010 | Barker | 248/206.5 |

FOREIGN PATENT DOCUMENTS

FR   2 660 589   10/1991

* cited by examiner

*Primary Examiner* — Anita M King
(74) *Attorney, Agent, or Firm* — Loginov & Associates, PLLC; William A. Loginov

(57) ABSTRACT

This invention provides a novel compact electronic device support that allows articulation for ideal positioning, aiming or viewing. It is compact, readily stored and quick to set up. Frictional and magnetic forces prevent rotational twisting and wobbling without mechanical parts. In one embodiment the system describes a ball and socket joint. In an alternate embodiment, the head of the threaded fastener is cup-shaped and the base support has a raised hemispherical pivot. In a further alternate embodiment, the base and the clip-on support together form a fob for a key-ring. The removable support can be connected to an electronic device and then connected to magnetic cup formed into the base for a ball and socket joint. In an additional alternate embodiment, the base support has a post having a geometric shape that inserts into a conforming threaded adapter that is removably attached into the electronic device's conventional tripod socket.

13 Claims, 7 Drawing Sheets

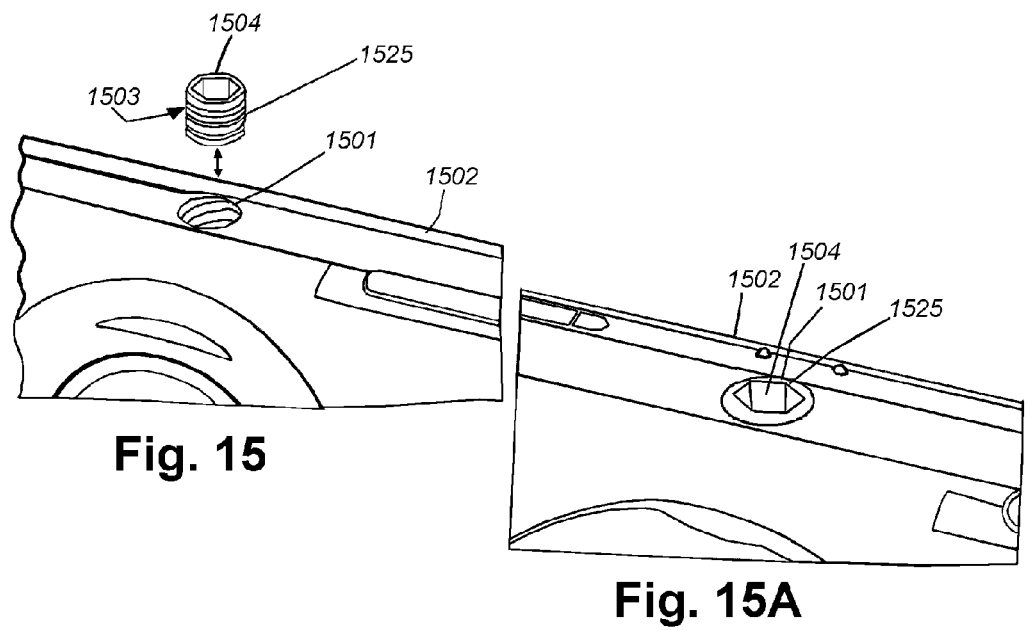
Fig. 15
Fig. 15A
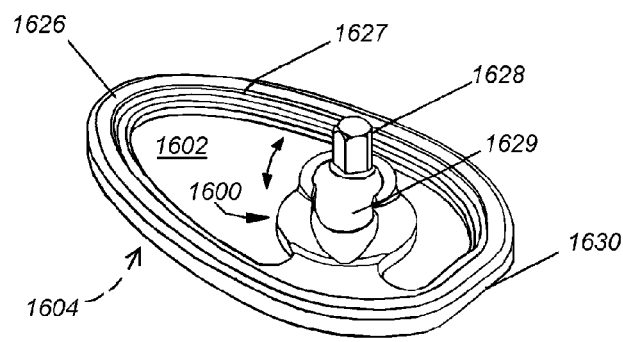
Fig. 16

ARTICULATING SUPPORT FOR ELECTRONIC DEVICES

RELATED APPLICATIONS

This application claims the benefit of U.S. Provisional Application Ser. No. 61/455,717, filed Oct. 25, 2010, entitled ARTICULATING SUPPORT FOR ELECTRONIC DEVICES, the entire disclosure of which application is herein incorporated by reference.

FIELD OF THE INVENTION

This invention relates to systems and methods in the technical field of electronic accessories. More particularly, this invention is in the technical field of electronic device supports.

BACKGROUND OF THE INVENTION

Conventional tripods and supports for electronic devices, such as cameras, are bulky and require the user to remove the support from a storage bag, set the arrangement and then thread the support into the bottom of the camera to attach it to the tripod. The tripod is often bulky and takes up space in a user's pocket or backpack.

The modern tripod is comprised of legs, a central brace, a locking tripod head and a threaded mounting bolt. The mounting bolt engages a threaded socket in the body of a conventional camera. In general, the extensive time required to set up a support, such as a tripod, prior to use often limits the number of times the support is used. Most tripods also have collapsible legs, but the collapsed assembly is still somewhat bulky.

By contrast, modern cameras are digital and no longer constrained to the use of film for recording images. Film is bulky within a camera and its replacement by digital receivers and recorders allows for a miniaturization of cameras and their inclusion into other electronic devices. Digital camera assemblies can be found in cellular telephones and handheld personal digital assistants ("PDAs"), such as the BlackBerry®. Modern compact cameras can be very small in dimensions and very light in weight. The energy required to operate a digital receiver is far less than that needed to drive a film advance gear mechanism, and this further reduces battery weights, and thus the overall weight. Compact digital video recorders have likewise been miniaturized as they no longer require films, video tapes or bulky battery packs. Many video devices are now also included in other handheld electronic devices, such as cellular telephones.

While cameras are now compact and more ubiquitous, the basic camera tripod remains unchanged in shape or size. A modern compact electronic camera mounted on top of a conventional camera tripod for a photographic purpose is often miniscule in comparison to the tripod. Given that most tripods were designed to accommodate a large, somewhat weighty, camera that includes a reflex lens, gear mechanisms, film and batteries, and a secure body housing to enclose them, the reduced size of the compact camera recommends a correspondingly smaller and simpler mounting flexible base.

By way of background, compact electronic devices generally include non-camera devices, including flashlights, laser pointers, virtual displays and Ground Positioning Satellite (GPS) devices, and devices that combine these various features/functions.

The volumetric and weight reductions of the compact electronic camera make it easier to carry a camera. Most compact electronic cameras or devices containing cameras can now fit into a small pocket or bag. By contrast, even the smallest tripod is still to large and bulky to fit into an ordinary pocket or small bag.

It would therefore be desirable for the electronic device support to be significantly more compact, quick to connect and quick to set up without the bulk of a conventional tripod.

SUMMARY OF THE INVENTION

This invention overcomes disadvantages of the prior art by providing a support device for compact electronic devices that is comparatively small and that allows articulation for ideal positioning, aiming or viewing. Unlike conventional tripod base mounts, which are comparatively bulky and heavier, the base support of the illustrative embodiments herein permit the user to easily attach and remove the electronic device and to orient it in various directions. The frictional grip of the base support and its magnetic cup upon the supported electronic device prevents rotational twisting and wobbling without the mechanical parts or larger dimensions of a conventional tripod base. The base support is comparatively lighter and smaller than conventional tripod bases and provides for easy storage when not in use.

In an illustrative embodiment the system describes a ball and socket joint that is formed by the engagement of a mounted pivot nub that is secured to the bottom of an electronic device and an annular magnetic cup on the base support. The ball is ferrous or magnetic and fits into the dish-shaped magnetic cup that is formed into the base support and is comprised of a ring magnet and a post of the bottom surface material, which is a gripping elastomeric polymer. The bottom surface material grips onto the underlying surface and prevents rotation and wobbling of the supporting electronic device. The pivot nub can be threaded and fitted into a tripod socket on the bottom of the electronic device or attached by double-sided self adhesive tape. The base support can have a lanyard ring that provides for attachment of a lanyard for suspension from another object when not in use. The ball joint can be manipulated for direction and vertical orientation. The base support is readily attached to and removed from the pivot nub.

In an alternate embodiment, the head of the threaded fastener is cup-shaped and the base support has a raised hemispherical pivot that juxtaposes the features described above while maintaining the functions of a magnetically and/or frictionally limited ball and socket joint. In a further alternate embodiment, the base and the clip-on support together form a fob for a key-ring. The clip-on support is removable and can be connected to an electronic device and then connected to magnetic cup formed into the base support to form a ball on socket joint. In an additional alternate embodiment, the base support has a hexagonal (or other geometric profile) post that inserts into a conformingly shaped threaded adapter (socket) that threadingly attached to the conventional tripod socket of an electronic device. The geometric profile of the post and socket can be varied.

In other illustrative embodiments, the support can feature a textured surface on the pivot nub and/or a taller friction post, or the support can be dimensionally increased or decreased in its overall size. The base has sufficient magnetic attractive force to provide for placement on vertical or overhead ferrous members.

BRIEF DESCRIPTION OF THE DRAWINGS

The invention description below refers to the accompanying drawings, of which:

FIG. 15 is a perspective view of a threaded hex connector for insertion into the bottom of a camera;

FIG. 15A is a perspective view of an illustrative threaded hex connector fully inserted into the bottom of a camera according to an alternate embodiment; and FIG. 16 is a perspective view of a carabiner with friction ball pivot and hex connector post for communication with a threaded hex connector installed into the bottom of a camera of FIG. 15.

DETAILED DESCRIPTION

Figure 1:
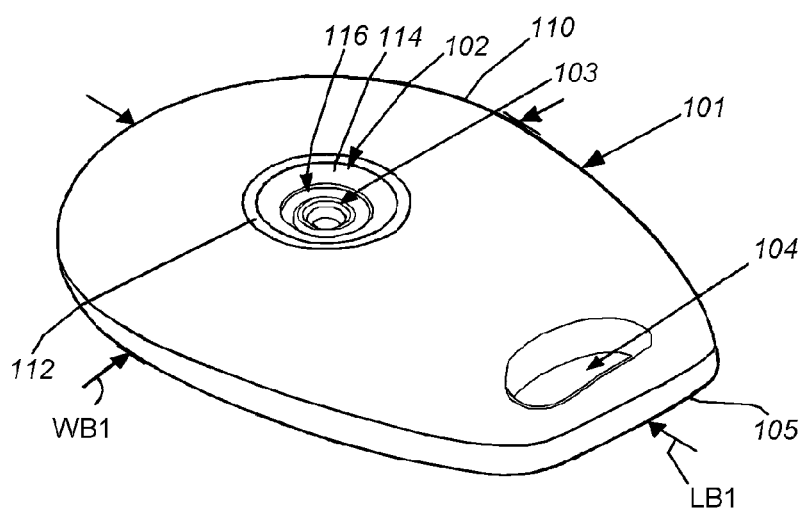
FIG. 1 is a perspective view of an articulating support for electronic devices according to an illustrative embodiment.

FIG. 1 is a perspective view of an articulating support system for electronic devices according to an illustrative embodiment. The base 101 of the support system is a stable platform for compact electronic devices and relies on attractive magnetic force and frictional force for articulation and securement of the compact electronic devices to the base 101. The shape of the illustrative base 101 is ovular. It is expressly contemplated that the shape of the base can be defined by any regular or non-regular shape.

As used herein, the term "compact electronic device" and variations thereof shall refer to any device that is typically handheld and benefits by the ability to pose the device in a desired orientation in two or three degrees of freedom (see below) using an articulable base support that is adapted to engage a somewhat flat surface, such as a counter, table, shelf, flat railing and the like. More generally, the device can include mechanisms that allow for the acquisition and/or display of image data (among other types of devices) that benefit from the ability to be posed in a predetermined orientation (e.g. for ease of viewing by a user) and/or aimed at a predetermined subject (e.g. for image acquisition, etc.).

The base 101 includes an annular magnetic cup 102 with an enclosed friction post 103, and a lanyard loop 104 that is created by the raised band 105. The magnetic cup 102 is a receiving member. The lanyard loop 104 allows for the attachment of a lanyard or ring that can in turn provide for suspension of the base 101 from the body or person of the user, an electronic device lanyard or an object. Raised band 105 provides clearance for common straps, cords and lanyards of appropriate size to wrap around while the base is flat on a planar surface. The overall width WB1 of the exemplary base is approximately 1 7/16 inches and the overall length LB1 is approximately 2 1/16 inches. It is expressly contemplated that these dimensions can be varied smaller or larger if the base is proportionally sized smaller or larger, or if another shape is used for the base. In general, it is contemplated that the overall area of the base is sufficient to support an electronic device in a predetermined orientation that is free a tipping or wobble.

It is expressly contemplated that the compact and/or handheld electronic device as defined herein is typically a relatively flattened device in which the height and width is substantially greater that the width and the device, even with extended protrusions, such as lenses retains a significant amount of weight distribution within the main body defined by the prevailing height, width and depth. Thus a compact digital camera with a relatively small and minimally projecting lens comprises such a device, as does a "smart" phone with a touch screen display and a relatively flush camera lens and imaging element. More typically, the "compact electronic device" contemplated herein (see also definition provided above) weighs approximately 5-7 ounces and defines a maximum width of 4-5 inches, a maximum height of 2-3 inches and a maximum depth of approximately 1 inch. These dimensions are exemplary and provided as a convention, and thus are highly variable in alternate embodiments as described below.

The material of the upper side 110 of the base is illustratively a molded, semi-rigid polymer. In various embodiments the upper side 110 of the base can be fabricated from resins, metals, wood products, composites, natural or synthetic rubber, man-made polymers (including Nylon, EVA, PP, ABS, and the like), or similar compounds. The exemplary base 101 weighs less than 4 ounces according to the illustrative embodiment. It is expressly contemplated that the use of alternate materials and/or alternate dimensions can increase or decrease the overall weight of the base to weigh more or less.

The annular magnetic cup 102 is circumscribed by a raised ridge 112 that shields the inset magnet 114. The magnet 114 is concave with a cutout circular center 116. The magnet 114 can be formed from any commercially available ferrous, rare earth, or other magnetic material. The underside 118 material is exposed by the circular cutout 104. At the circular center 116, the underside 118 material is formed into the friction post 103, defining a raised cylinder having a raised ridge 112. The contour of the friction post 103 and the magnet 114 together define the uniform bowled shape of the magnetic cup 102 that will engage the attaching member, pivot nub 206.

The material friction post 103 is a unitary part of the underside layer 118, and comprises an elastomeric polymer that can be co-molded with the more-rigid upper side. It is expressly contemplated that the underside 118 can be composed of a variety of pliable/elastomeric materials, including natural and synthetic rubber products, soft PVC, and the like. These materials can be provided in a variety of pleasing colors or patterns. The elastomeric property of the underside 118 material provides a frictional grip for the base 101 with respect to a supporting surface (e.g., ground, table top, etc.) and improves the overall stability of the support. The functionality of the friction post 103 will be described more fully below. The magnet is typically molded into the underside, which projects through the upper side in its central region as depicted. The overall assembly is a molded sandwich of three discrete components (i.e. magnet, rigid upper side and elastomeric lower side). In alternate embodiments, one or more components can be adhered, or otherwise fastened to the arrangement.

Figure 2:
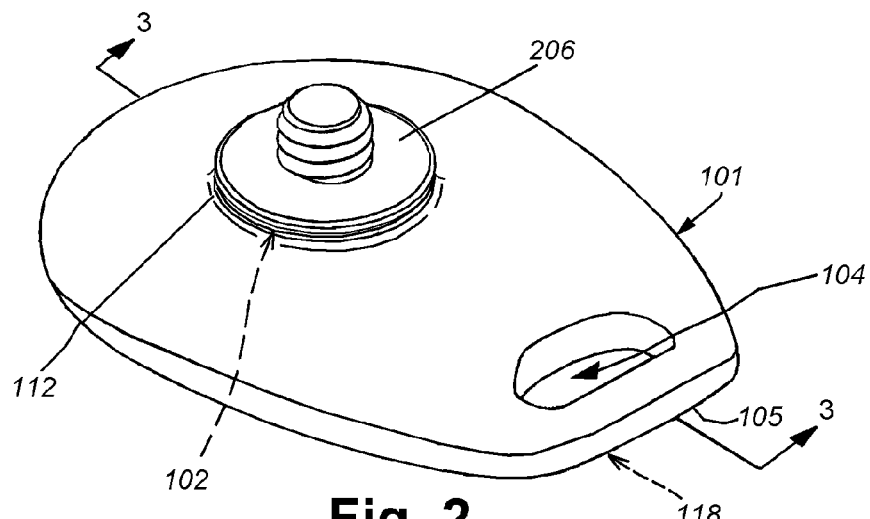
FIG. 2 is a perspective view of the support of FIG. 1 with a pivot nub received by, and secured in the magnetic cup according to an illustrative embodiment.

FIG. 2 is a perspective view of the support of FIG. 1 with a pivot nub 206 secured by magnetic attraction and frictional force in the magnetic cup according to an illustrative embodiment. This securement will be more fully explained in FIG. 3.

Figure 3:
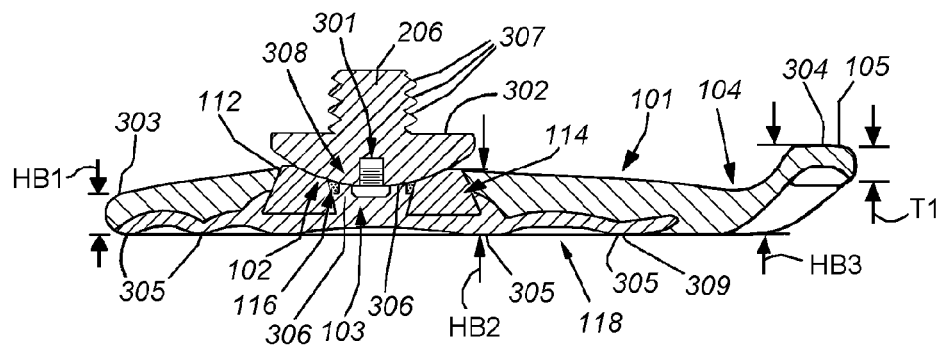
FIG. 3 is a side cross-section view of the support taken along the line 3-3 of FIG. 1.

FIG. 3 is a side cross-section view of the support of FIG. 1 according to an illustrative embodiment. The pivot nub 206 is attached to the base 101 at the magnetic cup 102, which serves as a receiving member located within the perimeter of the base 101. The pivot nub 206 is a short screw or bolt and is provided with threads 307 to engage the corresponding threaded well on a compact electronic device (not shown) and a slot 301 for tightening the pivot nub 206. As stated previously, the head 302 of the pivot nub 206 is has a surface 308 that conforms to the magnetic cup 102 and defines a conforming hemispherical shape. The height of the base 101 is varied. The height HB1 at end 303 is approximately 3/32nds of an inch. This height tapers to a thickness T1 of approximately 1/16 inch at end 304. The height HB2 of raised ridge 112 is approximately 1/8 inch. The height HB3 of the raised band 105 is approximately 1/4 inch. It is expressly contemplated that these dimensions can be increased or decreased as the base is proportionally sized smaller or larger. The elastomeric properties of the bottom surface 309 of the underside 118, combined with physical features, such as the ridges 305 enhance the gripping characteristics of the base 101 relative to the surface on which it is placed. This gripping characteristic allows the base 101 to be placed on level or angled surfaces without slipping.

With reference now to the joint formed between the pivot nub 206 and the magnetic cup 102, the circular magnet 114 is sufficiently strong to engage and retain the pivot nub 206 and the accompanying compact electronic device (not shown). This creates a removable connection. The joint defined by the engagement is moveable in at least two degrees of freedom. Illustratively, three degrees of freedom (e.g., roll, pitch and yaw-see respective double-headed arrows R, P and Y in FIG. 9). The joint functions as a ball-and-socket joint, similar to the human shoulder and hip, with magnetic and frictional forces restraining movement. The pivot nub 206 can be ferrous or magnetic for a stronger attractive force. In alternate embodiments, the pivot nub 206 can be magnetic while the magnetic cup 102 is formed on a ferrous material.

In prior art, a conventional tripod typically includes a mechanical locking device to hold the tripod head in the desired orientation. That is, a screw or clamp and is moved and biased to create holding pressure. The support described herein relies on a non-mechanical locking system to create the desired locking effect by a combination of the magnetic interaction between the pivot nub 206 and the magnetic cup 102 and the frictional grip of the friction post 103 with the pivot nub surface 308 and friction between the bottom surface 309 material and ridges 305 with the underlying surface (not shown) that can be substantially level, or pitched at an angle. The engagement of the friction post 103 with the hemispherical surface 308 of the pivot nub 206 provides rotational resistance friction and increases the overall stability of the base 101.

As a further option, the attractive force of the magnet 114 can be adapted to allow attachment of the base 101 and supported electronic device to a ferrous vertical surface. This depends upon the strength of the magnet and overall weight of the arrangement.

The attractive force between the pivot nub 206 and the magnet 114 causes and engagement between the friction post 103 and the surface 308 of the pivot nub 206. This compression causes raised rim 306 of the friction post 103 to deform outwardly and increase the frictional grip of the base upon the pivot nub 206. This is a significant feature in maintaining the angular elevation and directional orientation of the attached compact electronic device. In alternate embodiments, the frictional force can be increased by increasing the height of the friction post 103 within the magnetic cup 102. In yet another alternate embodiment, the surface 308 of the pivot nub 206 can be textured (e.g., sandblasted or etched) or knurled for greater engagement with the friction post 103 to increase rotational resistance so as to provide a stable orientation of the electronic device. Alternatively, or in addition to the nub, the surface of the magnet 114 can also be knurled or otherwise textured to increase rotational resistance. In various embodiments, such textured surfaces can be used instead of a friction post or in conjunction with the post.

Figure 4:
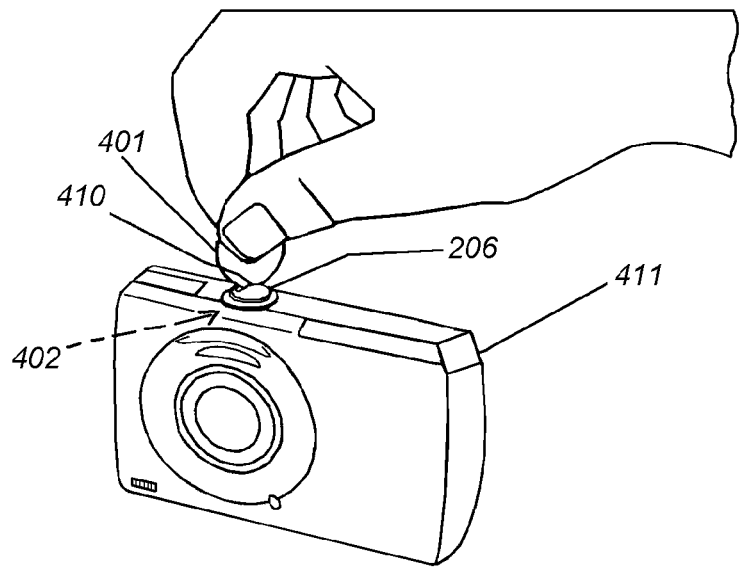
FIG. 4 is a perspective view of an exemplary compact electronic camera, in which a pivot nub is inserted into the bottom of the camera according to an illustrative embodiment.

FIG. 4 is a perspective view of an illustrative compact electronic camera 411, in which a pivot nub 206 is threadingly inserted into the bottom of the camera 411 according to an illustrative embodiment. A user is utilizing an exemplary tool (e.g., a coin 401) to tighten the pivot nub 206 via the slot 410 into a receiving tripod socket 402 (not shown) in the bottom of the camera 411. For cameras with centrally located tripod sockets, such as the depicted example, the user engages the threads 307 of the thread-on pivot nub 206 into the socket 402 of the device. This arrangement provides a fixed, ferrous, spherical surface 308 on the underside of the camera 411 for engagement with the base 101 (not shown).

Figure 5:
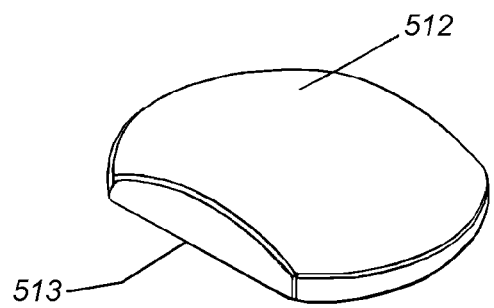
FIG. 5 is a perspective view of a self-adhesive/stick-on pivot nub for attachment to an electronic device according to an alternate embodiment.

FIG. 5 is a perspective view of an attaching member in the form of a stick-on pivot nub 512 having a self-adhesive surface 513 according to an alternate embodiment. This surface can be provided using commercially available double-sided tape. This embodiment is advantageous when the compact electronic device is not provided with an appropriate receiving tripod socket (e.g., a cellular telephone). The stick-on pivot nub 512 can be ferrous and/or magnetic and functions similarity to the above-described screw-in pivot nub 206.

Figure 6:
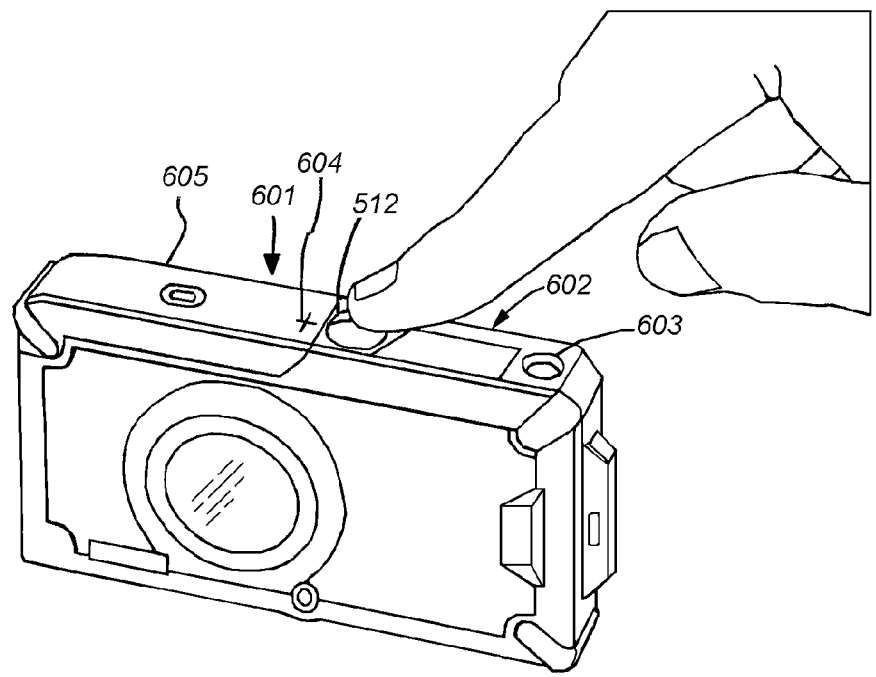
FIG. 6 is a perspective view of an exemplary compact electronic camera, in which a stick-on pivot nub is attached to the bottom of the camera according to an alternate embodiment.

FIG. 6 is a perspective view of a compact electronic camera 601, in which a stick-on pivot nub 512 of FIG. 5 is attached to the bottom surface 602 of the camera according to an alternate embodiment. The camera 601 is provided with a tripod socket 603, but the socket is located near an edge of the camera. It is often desirable that the compact electronic device be centered on the base (not shown) so that the weight of the electronic device is move evenly distributed for a more stable support. A central pivot point is desired to allow to the base 101 footprint to be reduced because the arrangement is better balanced. This centering also serves to minimize the pivot rotational resistance need to hold the camera at a desired angle. In this embodiment, the socket 603 is adjacent to (or proximate to) an edge, and the exemplary camera 601 will be off-center, resulting in a wobbly and unstable arrangement. Therefore, the user has attached a stick-on pivot nub 512 approximately at the midpoint/center 604 of the bottom surface 602. The exemplary camera 601 in this embodiment also includes a battery door 605 that extends through the midpoint/center 604 and the user has selected the nearest position on the bottom surface 602 so as not to interfere with the functionality of the battery door 605. It is often desirable that the stick-on pivot nub 512 be secured to the main body of an electronic device rather than a moveable door because a door can be less stable due to its potential to open during use.

More generally, the user can determine the balance point at a subject device and apply the nub at or near this balance point to achieve stability.

Figure 7:
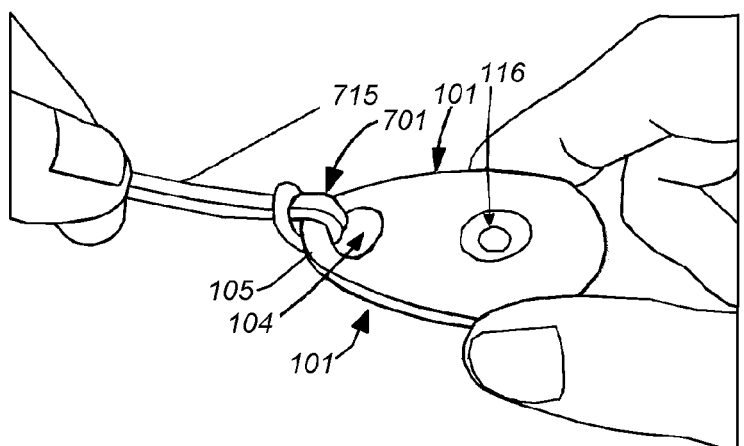
FIG. 7 is a perspective view of an exemplary lanyard attached to the support base via a loop through raised band according to an illustrative embodiment.

FIG. 7 is a perspective view of an exemplary cord, strap or lanyard 715 attached to the base 101 via a loop 701 around the raised band 105 according to an illustrative embodiment. The elevation of the raised band provides for the base 101 to be situated upon an underlying surface without the intrusive interference of the lanyard 715.

Figure 8:
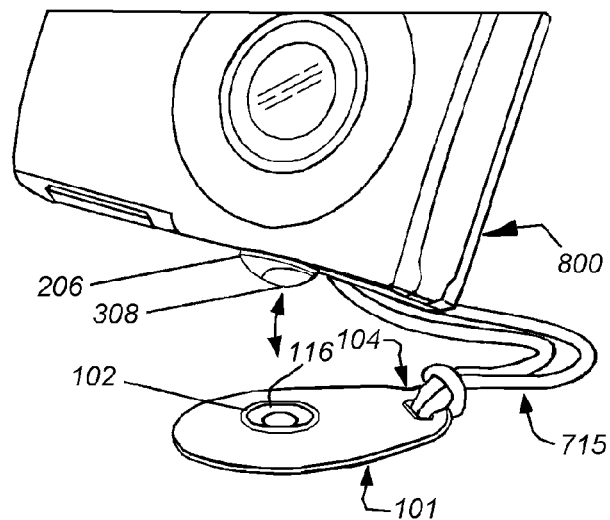
FIG. 8 is a perspective view of an exemplary compact electronic camera with an attached nub in the process of attachment to an articulating support for electronic devices according to an illustrative embodiment.

FIG. 8 is a perspective view of camera 800 with an engaged threaded pivot nub 206 about to be attached to base 101 of FIG. 1 according to an illustrative embodiment. As the camera 800 is brought close to the base 101, the magnetic cup 102 begins to exert a significant magnetic attraction. Thus, the pivot nub 206 approaches magnetic cup 102, magnetic attraction forces will increase and eventually force spherical surface 308 to engage and become co-radial with the top of magnetic cup 102. This creates a temporary, articulable joint between camera 800 and base 101. The user can easily overcome the rotation resistance created by the magnetic attraction forces between the base 101 and the pivot nub 206 to remove the camera 800 or to set the orientation of the camera 800 at various desired angles within each degree of freedom.

Figure 9:
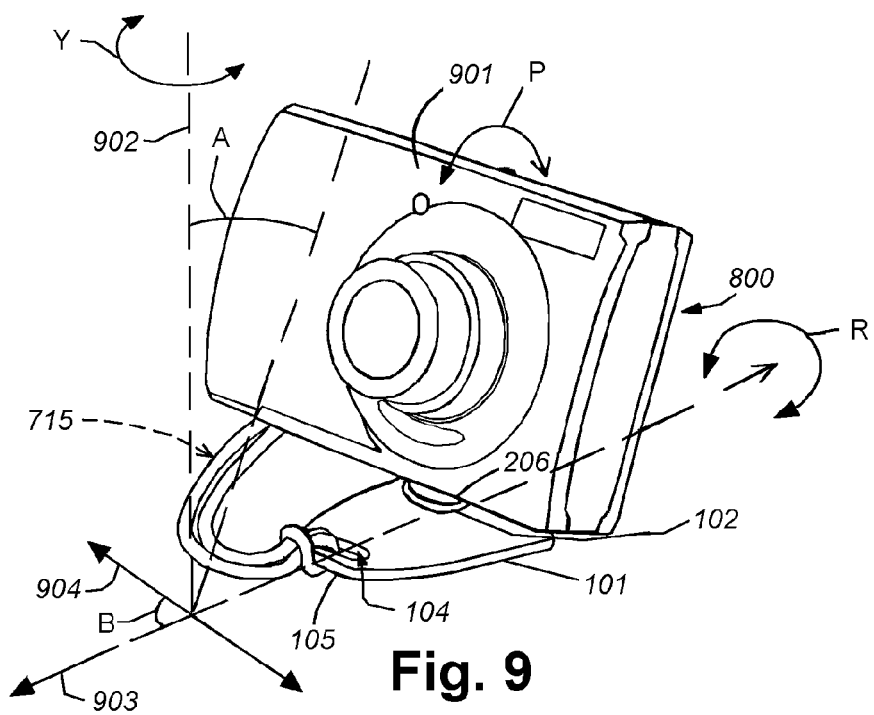
FIG. 9 is a perspective view of a compact electronic camera with an attached nub attached to the articulating support for electronic devices of FIG. 8 and being manipulated to a desired angle according to an illustrative embodiment.

FIG. 9 shows the exemplary camera 800 of FIG. 8 arranged at a predetermined. The camera 800 is oriented at vertical angle A so that the camera face 901 is reclined at angle A relative to the vertical axis 902. The camera face 901 is oriented at angle B relative to the central axis 903 of the base 101 and the axis 904 of the camera face 901. As noted above, the camera can be readjusted at will in up to three degrees of freedom (double-curved arrows R, P and Y).

Figure 10:
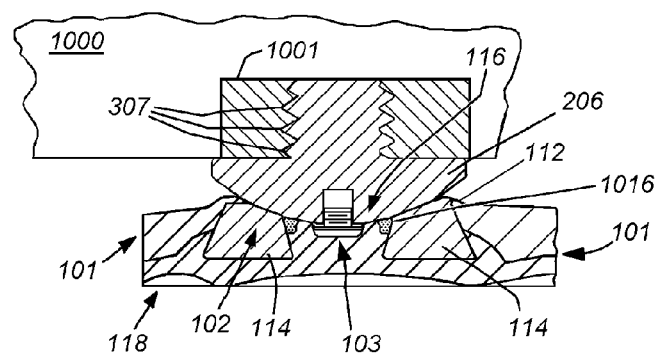
FIG. 10 is a side cross-section view of an articulating connector comprising a base integrated magnetic cup ring and a ferrous nub pivot connected to an electronic device according to an illustrative embodiment.

FIG. 10 is a close up cross-section view of a portion of an exemplary camera 1000 that is engaging a pivot nub 206 by a frictional fit created by the interface of the pivot nub threads 307 and the corresponding threads of the tripod socket 1001 joined with the base 101 at the magnetic cup 102. The frictional post top surface 1016 is in contact with the spherical surface 308 of the pivot nub 206. As noted above, the combined magnetic attractive force of the magnet 114 and the frictional force of the interface between the pivot nub surface 308 and the frictional post top surface 1016. These frictional forces provide the rotational resistance for the articulating connection between the camera 1000 and the base 101. It is understood that rotational resistance friction also comes from the surface of the magnetic cup 102 and the hemispherical surface 308, both of which could be textured to increase rotational resistance.

Figure 11:
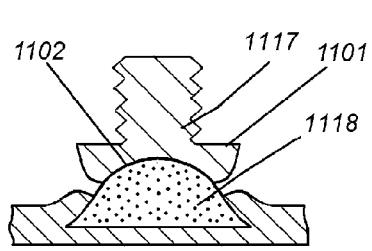
FIG. 11 is a side cross-section view of an articulating connector comprising a base integrated ferrous nub pivot have a concavity that engages a corresponding raised magnetic structure according to an alternate embodiment.

FIG. 11 is a side cross-section of an articulating connection comprising a ferrous cup shaped thread-on fastener 1117 having a head 1101 with a concavity 1102 that engages a corresponding base integrated dome (convex) shaped magnetic pivot nub 1118 according to an alternate embodiment. This arrangement juxtaposes the elements of the joint, whereas in FIGS. 1 to 10 above, it is contemplated that the socket is part of the base and the pivot nub is the convex ball. In this alternate embodiment, the ball is part of the base and the cup is formed on the camera-mounted fastener 1117. The fastener 1117 herein is illustratively constructed from of ferrous materials, and the pivot nub 1118 is magnetic. In a further alternate embodiment, the fastener is magnetic and the pivot nub is made of ferrous materials. Moreover, both components can be magnetic in various embodiments.

Figure 12:
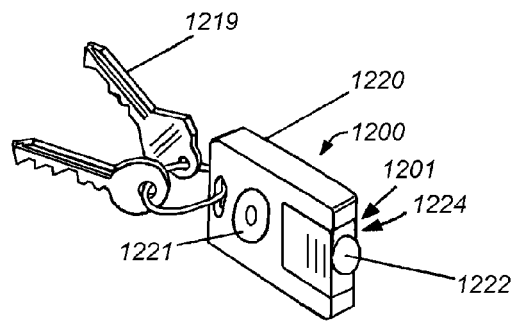
FIG. 12 is a perspective view of clip-on storable nub pivot in the stowed configuration and enclosed in an illustrative key ring fob according to an alternate embodiment.

FIG. 12 depicts an alternate embodiment in which the components of the support device is integrated with a fob 1200 on an illustrative key ring, shown with a plurality of exemplary keys 1219. The base 1220 is constructed with a receiving member comprising a magnetic cup 1221, similar in construction and function to the above-described magnetic cup. The storable clip-on support 1224 includes an attaching member in the form pivot nub 1222 and is shown in the stowed configuration and as part of the fob 1200. The reverse face 1201 has a gripping surface material that functions as the reverse side of base 101 described above.

Figure 13:
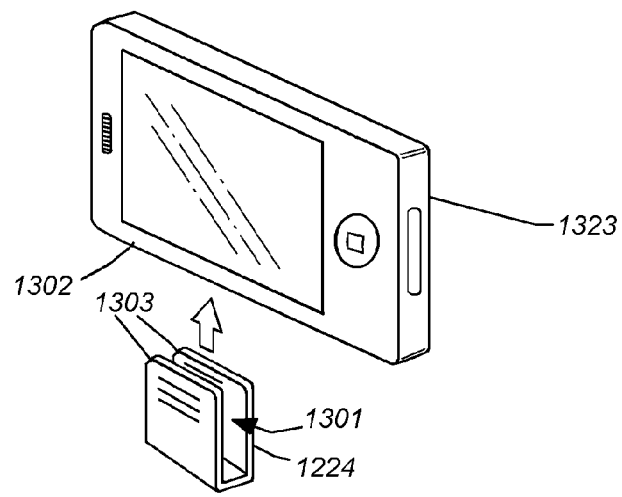
FIG. 13 is a perspective view of a clip-on storable nub pivot being attached to a cellular telephone according to an alternate embodiment.

In FIG. 13, the user has separated the clip-on support 1224 of FIG. 12 from the fob 1200 and is about to mount the clip-on support onto to the bottom edge of an exemplary cellular telephone 1323. The clip-on support 1224 is u-shaped in profile with a base and opposing clip wings that collectively define a central slot 1301. This slot is generally proportioned appropriately for accommodating the edge of an electronic device with slight, elastic deformation of the wings 1303 so that they apply frictional holding pressure to the cellular telephone 1323. In this example, the clip-on support 1224 is adapted to be biased onto an edge 1302 of a cellular telephone 1323. The clip-on support 1224 is frictionally secured to the cellular telephone 1323 by the stress and resulting friction imparted by the deformed wings 1303. The clip can be constructed from metal and/or a durable polymer.

Figure 14:
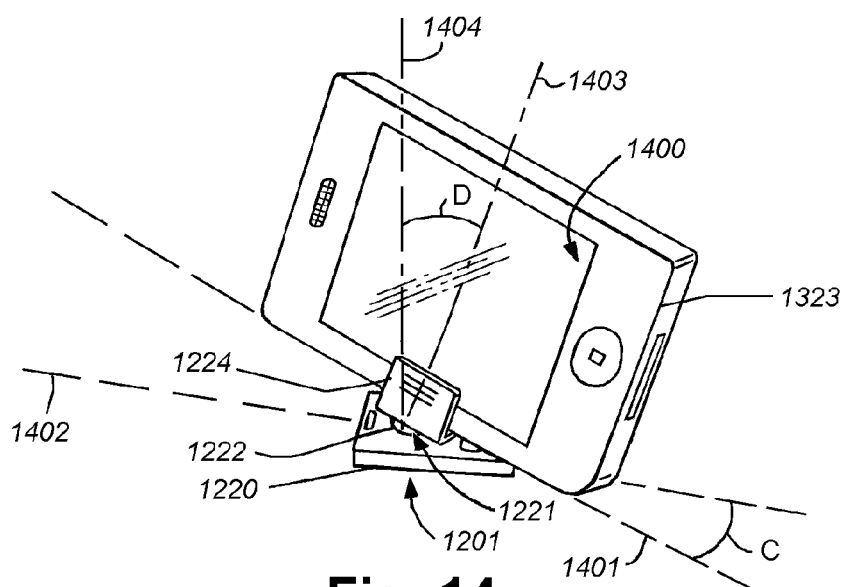
FIG. 14 is a perspective view of a clip-on, storable nub pivot according to an alternate embodiment attached to the base and supporting a cellular telephone at a desired angle set by the user.

In FIG. 14, the user has attached the exemplary cellular telephone 1323 of FIG. 12 to the base 1220 by placing the pivot nub 1222 into the magnetic cup 1221. The joint defined between the components functions as the joint described above and is secured by magnetic and frictional forces and fully supports the cellular telephone 1323. The user has moved the cellular telephone 1323 and arranged its horizontal orientation so that the axis 1401 of the face 1400 of the cellular telephone is at angle C relative to the central axis 1402 of the base. The vertical orientation of the face 1400 is reclined to the axis 1403 at an angle of D relative to the vertical axis 1404. The friction grip of the bottom 1201 functions in the same manner of the underside 110 material described above and grips the surface of the underlying support (e.g., a table, bench or the like) and prevents rotational forces. It is expressly contemplated that the support components of above-described key fob arrangement can alternately be integrated into another type of object that is capable of providing a sufficient stabilizing footprint. For example, the object can contain or define a Universal Serial Bus (USB) device (i.e. flash memory), a flashlight, laser range-finder, cosmetic case or other useful object. The electronic device-engaging portion of the support components for this object-based arrangement can be a clip-on, stick-on or screw-in type as described above.

FIG. 15 depicts an "attaching member" in the form of threaded tripod socket 1501 in the bottom of an exemplary camera 1502 according to another alternate embodiment.

This embodiment provides a system in which a non-threaded mounting post is inserted into a receiving fitting that is within a threaded adapter mounted into the tripod socket of a compact electronic device. As depicted, a hexagonal adapter fitting 1525 with external threading 1503 is about to be threaded into the tripod socket 1501 of the camera to make ready for its use with the base. In this embodiment, the socket 1504 is hexagonal. It is expressly contemplated that the adapter fitting 1525 can have a socket that has a geometric profile that is a rectangle, a square, a torque star, circular or any other shape that allow a close fit between components and rapid insertion/withdrawal. This illustrative adapter fitting thereby provides for a quick disconnect and re-connect of the electronic device and the base without a need to forcibly separate magnetic components.

FIG. 15A depicts the insertion of the hexagonal adapter fitting 1525 of FIG. 15 inserted into a threaded tripod socket 1501 in the bottom of an electronic camera 1502 according to an alternate embodiment.

FIG. 16 is a base support 1626 for supporting an electronic device that features a joint created by a "receiving member" in the form of a post and socket unit. The base support 1626 in this embodiment is formed as part of an exemplary carabiner having a spring-loaded gate for selective attachment to straps or other objects when not in use. The base support 1626 has a spring-actuated clip 1627 that opens and closes. The carabiner design reduces the overall weight of the base by using a profile that still defines the footprint of the base perimeter (without the internal filling material) thereby providing the sufficient stability to the support, as a result of the cut out interior 1602. The bottom surface 1604 can be illustratively provided with a layer of gripping elastomeric material in the manner of the base 101 above. The base support 1626 has an integrated mount 1600 that is formed as part of the base support body 1626. The mount encloses a frictional pivot ball 1629 of an upwardly projecting support post 1628, which can be articulated, but has sufficient frictional resistance to rotation so as to stabilize and support a compact electronic device as described/defined herein. That is, the pivot ball 1629 engages the base socket (receptacle) with sufficient surface friction to allow two/three-degree of freedom motion within a predetermined angular range (e.g. 30-45 degrees) when a user applies force to the device, but normally resists motion under the normal resting weight of the device. In an embodiment, the diameter of the inner perimeter/circumference of the base receptacle defines the maximum angular tilt in the two degrees of freedom. The receptacle an/or pivot ball can be smooth or include a friction-enhancing surface texturing.

In an embodiment, both the pivot post and the socket are non-magnetic and basically maintain a joint through action of gravity and the fact that the connection does not exceed about 45 degrees of tilt (thereby providing a continuous and sufficient vertically downward vector of force due to gravity to maintain the socket upon the post). The pivot post and socket can be constructed from any acceptable material including metals, polymers, and the like. In alternate embodiments, the post and socket can be magnetically attractive to provide added security to the joint formed therebetween. In this case, either of the post, socket, or both, define a magnet.

The post 1628 can be alternately be provided with a miniature ball and detent to securely mount the post 1628 into the adapter fitting 1525. It is desirable to provide a secure junction between the post 1628 and the adapter fitting 1525 to prevent rotation and wobbling between the base support 1626 and the supported compact electronic device. This joint allows a user to easily overcome holding resistance, set a desired orientation angle for the device in each degree of freedom. The base support 1626 can also include a raised band 1630 that allows tethering the support to a lanyard.

Note that this post-based arrangement can also be applied to an object-based system, such as the key-fob, etc., as described above. The object can include a molded surface that receives the post assembly and allows it to move in two-three degrees of freedom.

It should be clear that the articulating support according to the various embodiments herein provides a versatile, compact, lightweight and generally pleasing mechanism for supporting a variety of electronic devices, particularly those used to acquire or display images. Such devices benefit by a stable platform that allows for orientation in two or three degrees of freedom. The support of the various embodiments allows for easy adjustment of the articulation/orientation of the subject device and straightforward attachment/detachment free of any need for clamps, threads, or other mechanical locking systems. Moreover, the illustrative embodiments lend themselves to a variety of pleasing shapes, colors, sizes and materials.

The foregoing has been a detailed description of illustrative embodiments of the invention. Various modifications and additions can be made without departing from the spirit and scope of this invention. Each of the various embodiments described above may be combined with other described embodiments in order to provide multiple features. As used herein, the directional terms "top", "bottom", "upper" and "lower" are relative terms and are not to be construed in an absolute manner. Furthermore, while the foregoing describes a number of separate embodiments of the apparatus and method of the present invention, what has been described herein is merely illustrative of the application of the principles of the present invention. With appropriate, friction-producing surface texture this embodiment can provide an articulable connection allowing the user to define a variety of camera angles. Alternatively, it is understood that similar results can be achieved by any combination of one or more magnetic components of the articulating connection. As stated above, the surface of the ball joint that is created by the pivot nub can be textured or smooth. One or both of the connecting components various post and socket devices can magnetic to enhance the holding strength of the connection. Also, in various embodiments the elastomeric friction post (see FIG. 3) can be constructed with a taller profile relative to the surrounding magnetic bowl for greater friction. In addition, while the annular magnet and friction post are provided to the receiving member on the base, they can be applied to the attaching member (nub) in alternate embodiments. The overall dimensions of the base can also be varied upwards or downwards. The magnetism of a base equipped with a magnetic cup can be used to place the base support onto a vertical ferrous member (e.g., a pipe or beam) for use as a surveillance device, or if the magnetic is sufficiently strong, onto an overhead beam or plate. The various components of this support device can be furnished as part of a kit, including a lanyard, one or more stick-on pivot nubs, one or more threaded pivot nubs and a base element. Also, where terms like "convex", "concave", "hemispherical", and the like, are employed with respect to the articulating joint of an attaching and receiving member they should be taken broadly to include partial surfaces having these characteristics, typically where they interengages to create the joint. Accordingly, this description is meant to be taken only by way of example, and not to otherwise limit the scope of this invention.

What is claimed is:

1. A system for movably supporting a compact, handheld electronic device comprising:

a base having an outer perimeter and defining a sufficient footprint to stably support the device;

a removable attaching member secured to the electronic device along a bottom or side thereof;

a receiving member that resides within the base, wherein at least one of the removable attaching member and the receiving member comprises an annular magnet; and a frictional post extending within a center of the annular magnet, constructed and arranged to frictionally engage the attaching member when the removable attaching member is engaged to the receiving member, wherein the receiving member and removable attaching member are removably connected together to form a joint that allows the electronic device to be moveable about a pivot nub so as to tilt in at least two degrees of freedom and maintain a selected orientation based upon friction acting between the receiving member and the removable attaching member being adapted to reside on the electronic device.

2. The system as set forth in claim 1 wherein the annular magnet defines, at least in part, a hemispherical shape.

3. The system as set forth in claim 1 wherein the annular magnet includes a concave shape and the attaching member defines a convex hemispherical shape.

4. The system as set forth in claim 1 wherein the frictional post is unitary with a portion of the bottom and comprises an elastomeric material.

5. The system as set forth in claim 1 wherein the attaching member is secured to the electronic device by one of a threaded connection, a clip, and an adhesive.

6. The system as set forth in claim 5 wherein the removable attaching member is attached to the electronic device with a threaded connection on the electronic device.

7. The system as set forth in claim 1 wherein the base is part of a functional article.

8. The system as set forth in claim 1 wherein the functional article includes a structure adjacent to the outer perimeter and at least portions inside the outer perimeter are hollow.

9. The system as set forth in claim 1 wherein at least one of the attaching member and the receiving member includes a friction-enhancing textured surface thereon.

10. The system as set forth in claim 1 wherein the receiving member comprises a convex structure and the attaching member is a conformingly concave structure, each being magnetically attracted to the other.

11. The system as set forth in claim 10 wherein at least one of the convex structure and the concave structure is at least in part hemispherical.

12. A system for movably supporting a compact, handheld electronic device comprising:

a base having an outer perimeter and defining a sufficient footprint to stably support the device;

a receiving member that resides within the base;

a removable attaching member secured to the electronic device along a bottom or side thereof, wherein at least one of the receiving member and the attaching member comprises an annular magnet; and a frictional post extending within a center of the annular magnet, constructed and arranged to frictionally engage the attaching member when the attaching member is engaged to the receiving member wherein the receiving member and attaching member are removably connected together by magnetic attraction to form a joint that allows the electronic device to be moveable about a pivot nub so as to tilt and maintain a selected orientation based upon friction acting between the receiving member and the removable attaching member being adapted to reside on the electronic device.

13. The system as set forth in claim 12 wherein the attaching member is secured to the electronic device by one of a threaded connection, a clip, and an adhesive.

* * * * *